United States Patent
Grohs

(10) Patent No.: US 10,520,345 B2
(45) Date of Patent: Dec. 31, 2019

(54) DISPENSER

(71) Applicant: 4gourmet innovation GmbH, Vienna (AT)

(72) Inventor: Alexander Grohs, Vienna (AT)

(73) Assignee: 4gourmet innovation GmbH, Vienna (AT)

( * ) Notice: Subject to any disclaimer, the term of this patent is extended or adjusted under 35 U.S.C. 154(b) by 0 days.

(21) Appl. No.: 16/069,780

(22) PCT Filed: Dec. 29, 2016

(86) PCT No.: PCT/EP2016/082869
§ 371 (c)(1),
(2) Date: Jul. 12, 2018

(87) PCT Pub. No.: WO2017/121625
PCT Pub. Date: Jul. 20, 2017

(65) Prior Publication Data
US 2019/0017856 A1   Jan. 17, 2019

(30) Foreign Application Priority Data
Jan. 15, 2016   (EP) ..................................... 16151547

(51) Int. Cl.
*G01F 11/30* (2006.01)
*A47G 19/34* (2006.01)

(52) U.S. Cl.
CPC .............. *G01F 11/30* (2013.01); *A47G 19/34* (2013.01)

(58) Field of Classification Search
CPC ................................ G01F 11/30; A47G 19/34
USPC ......................................................... 222/36
See application file for complete search history.

(56) References Cited

U.S. PATENT DOCUMENTS

| 3,367,543 A * | 2/1968 | Preston | A47G 19/34 |
| | | | 222/285 |
| 3,823,853 A * | 7/1974 | Alden | G01F 11/18 |
| | | | 141/320 |
| 2016/0069722 A1* | 3/2016 | Singh | A47G 19/34 |
| | | | 222/1 |

FOREIGN PATENT DOCUMENTS

| CH | 153 431 A | 3/1932 |
| DE | 16 51 682 U | 3/1953 |
| DE | 27 05 297 A | 8/1978 |
| DE | 29 26 659 A1 | 1/1981 |
| DE | 92 17 208 U1 | 4/1994 |
| DE | 203 12 737 U1 | 10/2003 |

(Continued)

OTHER PUBLICATIONS

International Search Report and Written Opinion of the International Searching Authority for International Patent Application No. PCT/EP2016/082869 dated Apr. 6, 2017, 11 pages.

*Primary Examiner* — Donnell A Long
(74) *Attorney, Agent, or Firm* — Merchant & Gould P.C.

(57) ABSTRACT

A dispenser (1) for discharging an amount of a substance to be discharged includes a container (4) with a discharge opening (6), and a metering device (14). The metering device (14) is mounted movably relative to the discharge opening (6) and has at least one recess (16) for conveying the substance to be discharged through the discharge opening (6) and out of the container (4). The metering device (14) is connected to a drive element, particularly to a spring element (13), and the drive element is configured to accelerate an amount of the substance that is received in the recess (16) of the metering device (14), as the amount leaves the dispenser (1).

16 Claims, 15 Drawing Sheets

(56) References Cited

FOREIGN PATENT DOCUMENTS

FR 712 916 A 10/1931
GB 1 133 137 A 11/1968

* cited by examiner

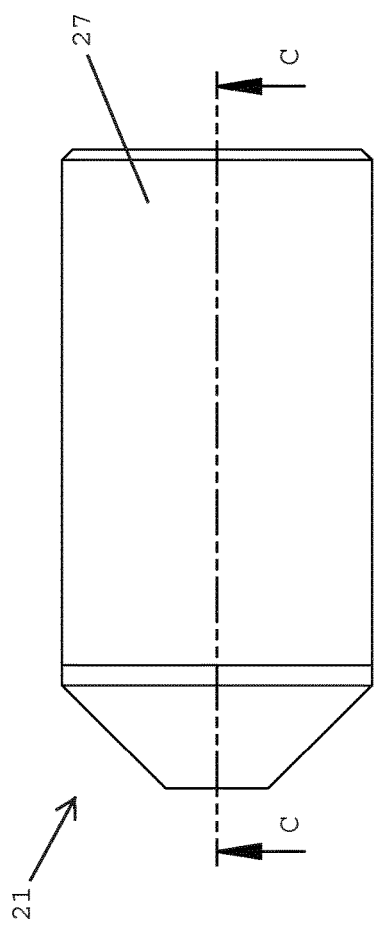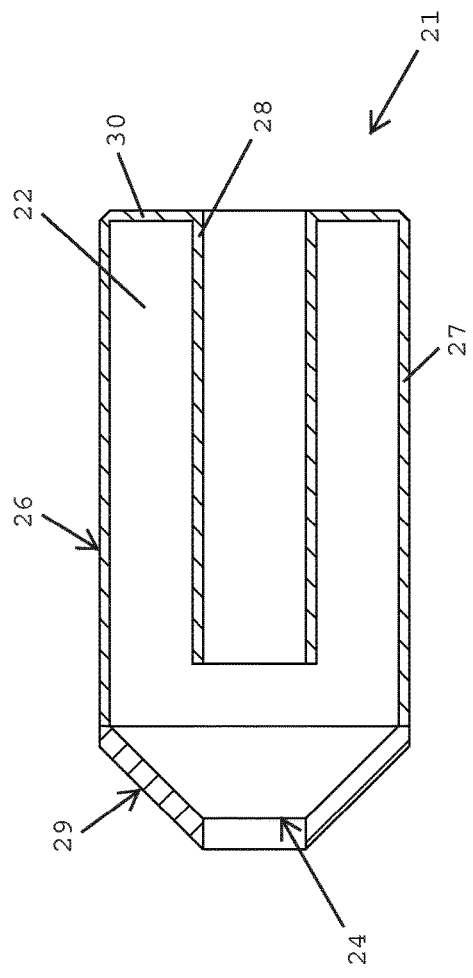
Fig. 5B
Fig. 5C

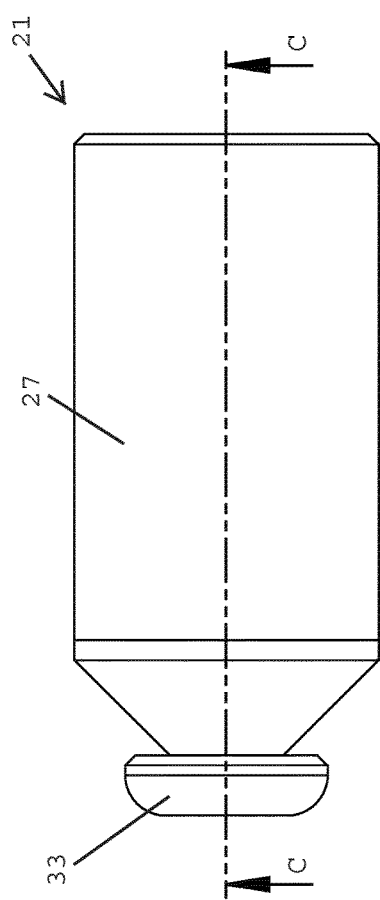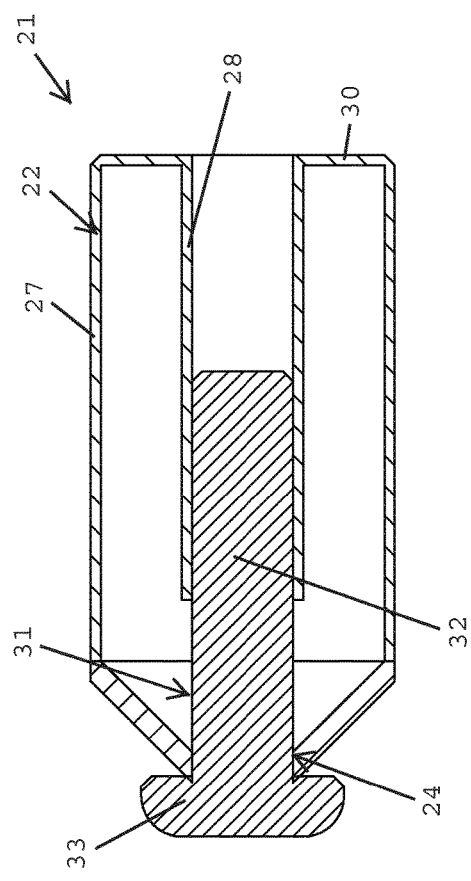

DISPENSER

This application is a National Stage Application of PCT/EP2016/082869, filed 29 Dec. 2016, which claims benefit of European Patent Application Serial No. 16151547.3, filed 15 Jan. 2016 and which applications are incorporated herein by reference. To the extent appropriate, a claim of priority is made to each of the above-disclosed applications.

BACKGROUND OF THE INVENTION

The invention relates to a dispenser, that is a device for discharging an amount of a substance to be discharged, a cartridge for use in such a dispenser and a method for using such a dispenser. In particular, the invention relates to a portable dispenser to be operated manually by a user. In detail, the invention relates to both a dispenser as such and a dispenser interacting with a cartridge and supplemented by the cartridge, whereby the relevant dispenser and the relevant cartridge are interacting with each other. The substance to be discharged may, for instance, be a free-flowing material, granular material (grit) or a liquid. The substance to be discharged is preferably a spreadable foodstuff, in particular a condiment or salt.

In one embodiment the dispenser comprises a container comprising a discharge opening and a metering device that is mounted (or supported) movably relative to said discharge opening and that has at least one recess for conveying the substance to be discharged through the discharge opening and out of the container, said metering device being connected to a drive element, particularly to a spring element. The metering device thus serves to limit or measure the amount of substance discharged. The drive element may preferably be a spring element which is formed by a mechanical spring or a gas spring or a comparable elastic element.

In another embodiment the dispenser comprises a cartridge holder for holding a cartridge and a drive unit that is mounted movably relative to the cartridge holder, wherein a container comprising a discharge opening and the metering device that is mounted movably relative to the discharge opening and that has at least one recess for conveying the substance to be discharged through the discharge opening and out of the container is part of the cartridge to be received by the cartridge holder; that is the cartridge itself comprises a container having a discharge opening and a metering device that is mounted movably relative to said discharge opening and that has at least one recess for conveying the substance to be discharged through the discharge opening and out of the container.

A dispenser or portioning device according to the first mentioned embodiment is known from DE 20312737 U1 already. The spring element connected to the slider serves the return movement of the slide after ejection of the free-flowing material, whereby the metering device with the emptied metering chamber, which is formed by the slider, supported by the spring element, is pushed back into a receiving position against gravity in order to receive the free-flowing material from the supply chamber. Accordingly, upon actuation of the slider, the material received in the metering chamber is pushed against the restoring force of the spring through the spread opening.

The GB 1 133 137 A describes a similar dispenser comprising a spring which supports a retraction of a metering device, which is formed by a piston, into a receiving position in the dispenser.

The U.S. Pat. No. 3,823,853 A discloses a dispenser comprising a spring, wherein the spring holds a piston in a position, in which the discharge opening is closed.

In connection with the device shown in the CH 153 431 A it is described that a lower portion retains an upper portion of a plunger with light compression of a spring. It directly follows from this that the spring effects a retraction of a metering device called plunger into the container.

In addition, the FR 712 916 A shows a caster, in which a plunger is held in a closed position by a spring, and thus ejection can take place only against the spring force.

Similar devices are further known from e.g. DE 9217208 U1 and DE 1651682 U.

A disadvantage of the known dispensers is that the direction and distribution of the substance to be discharged are not reproducible upon discharge or ejection. Thus, there may result strong fluctuations in terms of the concentration of the substance to be discharged on the target surface, which is undesirable in many applications, since it calls for a subsequent distribution or homogenisation. In some cases, such a subsequent distribution is not possible at all, so that the uneven concentration must be accepted. For example, in the case of an application as a salt cellar on solid or specifically formed foodstuffs, a uniform distribution would not be possible without fragmentation of the foodstuffs, so that a non-uniform salt concentration resulting in an unpleasant taste must be accepted.

The mentioned fluctuations of the concentration in particular result from the dependence of the direction and distribution of the substance to be discharged on the orientation of the dispenser and the gravity acting on the substance due to the discharge as well as on the variation of the force acting on the metering device due to—generally non-reproducible or badly reproducible—manual operation.

On the other hand, devices have been known already which allow a reproducible discharge of a substance in terms of direction and distribution. For example, the DE 2705297 A1 illustrates a snuff dispenser, in which a pinch can be flung upwards and out of the device by means of a spring force. However, the device does not comprise a metering device within the meaning of the present invention and a metering may at best take place manually by means of controlling the snuff freely trickling through an opening and out of the container. Accordingly, the spring force naturally cannot act on a metering device—which is not present. In this device, above all the reproducibility suffers from the non-reproducible amount of substance to be discharged. In addition, in this device the desired ejection only functions against gravity, that is with an opening aligned upwards, since otherwise the pinch would fall out of the discharge device prior to ejection.

Another snuff dispenser is known from DE 2926659 A1. In this dispenser a separate metering mechanism is provided, which is supposed to remove a defined amount from a container and prepare its ejection. Said device has the disadvantage that metering and ejection are separate and thus the device not only is more complicated in terms of production but also hardly offers any protection against excessively metering, upon ejection. In particular, an amount of substance which was not properly discharged previously may remain within the ejection mechanism, so that due to the functional separation of metering and ejection according to said metering mechanism, an accumulation and a corresponding excessive metering may occur upon ejection. Here, too, the ejection only functions against gravity.

SUMMARY OF THE INVENTION

It is an object of the invention to improve the reproducibility of the amount as well as of the direction and the distribution of the substance to be discharged upon discharge.

According to the invention, in a dispenser of the above cited type said object is achieved in that the drive element is configured to accelerate an amount of the substance, which is received in the recess of the metering device, in the direction of ejection as said amount leaves the dispenser. The acceleration of the amount of substance effected by the drive element, as the amount leaves the dispenser, therefore has a component directed in the direction of ejection. The direction of ejection thus refers to that direction in which the metering device moves upon leaving the dispenser in order to discharge an amount of substance through the discharge opening. The direction of ejection is preferably essentially in parallel to a movement axis of the metering device and extends from inside the container outwards and through the discharge opening. In contrast to known dispensers having a reliable metering, the drive element does not counteract the gravity upon ejection of the amount of substance to be discharged, but supports the ejection from the dispenser. Thus, the drive element constitutes a technical means for the exertion of force on the metering device or the amount of substance which is received in the recess of the metering device (for example of the spreadable material). The drive element may be—as mentioned above—a mechanical spring or a gas spring or a comparable elastic element. In this case, the drive element formed by a spring element is arranged such that it is relaxed upon conveying the substance to be discharged out of the container or between conveyance from the container and leaving the recess of the metering device and thus effects an acceleration of the metering device and consequently of the volume of substance conveyed thereby. Since the acceleration effected by the spring element for a certain substance to be discharged practically exclusively depends on the properties of the dispenser, particularly of the spring element and the metering device, and naturally these properties do not change or hardly change, the acceleration can be reproduced very well. Hence, the direction and distribution of the substance to be discharged resulting from this acceleration are likewise reproducible. In consideration of further existing fluctuating influences (e.g. gravity), the result will be at least an improvement of the reproducibility as a whole, because the fluctuating influences make up for only a reduced relative part in the overall acting influences on the direction and distribution.

The spring element is preferably configured such that the spring force exerted by the spring element replaces or surmounts the manual exertion of force on the metering device. Thus, the (fluctuating) influence of the manual operation is practically excluded and the reproducibility is further increased. It is particularly preferred that the spring force exerted by the spring element also exceeds the gravity, so that the influence of the relative orientation of the dispenser during discharge on the direction and distribution of the substance discharged is comparably low. In particular, in the present dispenser the ejection functions also and in particular with or in the direction of gravity, that is with the discharge opening directed downwards.

Alternatively, the drive element may be formed by a linear electromagnetic drive, for example a linear motor. In this case, the dispenser may comprise an energy storage, for example in the form of a battery or an accumulator which is designed for the power supply of the drive. In another alternative, a solenoid or an electric motor for biasing a spring element may be provided, so that the drive element comprises a spring element and a solenoid or electric motor.

The cited object is also achieved in a corresponding manner in the case of a dispenser of the other embodiment mentioned above in that the drive unit comprises a second coupling part for connection to a first coupling part of a cartridge held by the cartridge holder, and in that the drive unit comprises a drive element, in particular a spring element, which in operation is equipped with a cartridge held in the cartridge holder for accelerating an amount of the substance which is received in the recess of the metering device of the cartridge in the direction of ejection, as said amount leaves the dispenser. As a result, the dispenser or its drive unit is connected to the cartridge or its metering device via a two-part coupling during operation. In the cartridge of the type mentioned above, which supplements the dispenser, it is intended that the metering device has a first coupling part for connection to a second coupling part of said dispenser in order to achieve the object. The first and second coupling parts jointly form a connection between the drive unit of the dispenser and the metering device of the cartridge, through which forces are transmitted and synchronous operation is made possible. In particular, the force exerted by the drive element is transmitted via the coupling parts to the metering device and consequently to the volume of material conveyed during ejection. The coupling parts can, for example, be designed as magnetic coupling parts with at least one permanent magnet. Alternatively, a mechanical connection, e.g. a screw connection or a hook connection is also possible.

Also in connection with the aforementioned dispenser, which itself comprises the metering device, it is useful if the container is formed by a replaceable cartridge. This makes it easy to refill the material to be discharged from the dispenser, especially for liquids or fine spreadable material. Otherwise, a comparably simple handling would only be possible by completely replacing of the dispenser, which would result in disproportionately high packaging costs, compared to the material costs of the substance to be discharged in the container due to the comparatively high-quality ejection mechanism.

Accordingly, the invention also comprises a cartridge for use in such a dispenser, comprising a container for a substance to be discharged, the container comprising a discharge opening adapted to receive a metering device of the afore-mentioned dispenser. The cartridge thus complements the dispenser according to the invention by making the container available for storing the substance to be discharged and cooperates with the dispenser inasmuch as the discharge opening of the container is coordinated with the dispenser, in particular with its metering device.

In a mechanically comparatively simple design of the present invention, the metering device is formed by a piston mounted displaceably relative to the container. In this case, a linear-acting drive element, e.g. a tension or compression spring can be used, which acts directly on the metering device. On the whole, this results in a relatively inexpensive and reliable device for the dispenser and possibly also for the cartridge (if the metering device is part of the cartridge). The at least one recess of the metering device can, for example, be formed by a cavity, in particular a circumferential cavity in the piston.

In particular in connection with a liquid or spreadable material, which forms lumps on contact with moisture, it has proven to be favourable if the container is substantially closed off from the surroundings of the container by the metering device at least in a receiving position of the metering device, in which a volume of the at least one recess communicates with a volume of the container. Such a closure can be achieved, for example, by adjusting the discharge opening and the metering device to the effect that the discharge opening is completely filled and thus sealed by a part of the metering device.

Preferably, the drive element is formed by a spring element which is biased in the above-mentioned receiving position. For example, the spring element can be held in the receiving position by a locking element. The restoring force of the spring element accordingly accelerates the metering device from the pick-up position to a discharge position, whereby the volume of substance received is accelerated together with the metering device.

Furthermore, it is advantageous if the dispenser or, if applicable, the cartridge has a discharge channel adjoining the discharge opening of the container, whereby the metering device forms a sluice with the discharge channel. The at least one recess of the metering device is arranged to convey a defined maximum volume of the substance to be discharged through the discharge opening and out of the container. Such a sluice for the container is preferably the only access to the container volume during operation. The discharge channel surrounds the metering device in such a way that the volume received in the recess of the metering device is closed when the recess passes through the discharge channel and is thus closed and, in particular, guided towards outside the dispenser separately from the container volume. The container is therefore closed off against the surroundings of the dispenser at all times. This means that contamination of the container, e.g. by moisture ingress, can mainly be avoided. Due to the temporarily closed volume of the recess, the recess limits the maximum volume of the substance to be discharged which is withdrawn from the container in one discharge cycle and thus reliably prevents excessive metering.

In addition, it is advantageous if the dispenser or, as the case may be, the cartridge comprises a discharge channel connecting to the discharge opening of the container, whereby the metering device forms a sluice together with the discharge channel. The at least one recess of the metering device is configured to convey a defined maximum volume of the substance to be discharged through the discharge opening and out of the container. In operation, such a sluice for the container is preferably the only access to the container volume. The discharge channel surrounds the metering device in such a way that the volume received in the recess of the metering device is closed when the recess passes through the discharge channel, and thus is closed and, in particular, is guided towards outside the dispenser in particular separate from the container volume. The container is therefore closed vis-à-vis the surroundings of the dispenser at all times. This means that contamination of the container, e.g. by moisture ingress, can mainly be avoided. Due to the temporarily closed volume of the recess, the recess limits the maximum volume of the substance to be discharged which is withdrawn from the container in one discharge cycle and thus reliably prevents any excessive metering.

In view of the discharge behaviour determined otherwise to the benefit of reproducibility—as explained above—it is particularly favourable that the volume of the at least one recess in the metering device can be adjusted. Such an adjustment of the volume of the recess causes an equally reproducible change in the distribution of the discharged substance due to the total quantity changed, so that the original object of the invention is still achieved properly. Adjustment can be achieved, for example, by means of an adjustable screw which changes an extension of the recess. Alternatively, an adjustment by means of inserts, which are inserted in the recess and thus change the volume of the recess, would also be possible.

In order to allow reliable and reproducible discharging and metering even with quantities of material larger than the volume of the recess, it is favourable that the metering device of the dispenser or the drive unit is connected to a counting device, whereby the counting device is configured to count the discharge cycles, i. e. each a conveyance of the defined or set maximum volume of the substance to be discharged, which is received in the recess, through the discharge opening and out of the container, when the dispenser is used. For example, the counting device can mechanically or electronically record the number of discharge cycles and output the recorded number (e. g. display or otherwise transfer).

To achieve an optimum distribution of the discharged substance with respect to the discharge direction and target surface, the shape and geometry of the metering device, in particular the recess and/or the discharge opening or the discharge channel can be adapted by taking into account the acceleration caused by the drive element.

Furthermore, a weighing device which is either integrated or connected to the dispenser can be provided, which registers a change in weight of the container, the cartridge or the entire dispenser and thus offers the possibility of controlling the metering of the substance discharged. Thereby, it is possible to detect, for example, an inefficient/incomplete use of the recess during conveyance. In addition, in the case of an adjustable recess, the discharge amount can be calibrated on the basis of the amounts determined by the weighing device, if necessary together with the counting device.

The method according to the invention for using one of the dispensers defined above comprises one or more discharge cycles, wherein a discharge cycle comprises a movement of the recess of the metering device from a receiving position, in which a volume of the at least one recess communicates with a volume of the container, through the discharge opening into a discharge position, in which a volume of the at least one recess communicates with the surroundings of the dispenser, wherein an amount of substance conveyed in the recess is accelerated in the direction of ejection by the drive element, prior to reaching the discharge position.

Due to the acceleration or, in particular, the abrupt stopping of the metering device upon reaching the final position of the discharge position, a complete emptying of the recess is ensured or at least substantially facilitated.

BRIEF DESCRIPTION OF THE DRAWINGS

The invention will be explained in more detail below on the basis of particularly preferred embodiments, but is not limited thereto, and with reference to the drawings. The drawings show in detail.

DETAILED DESCRIPTION OF THE PREFERRED EMBODIMENT

Figure 1A:
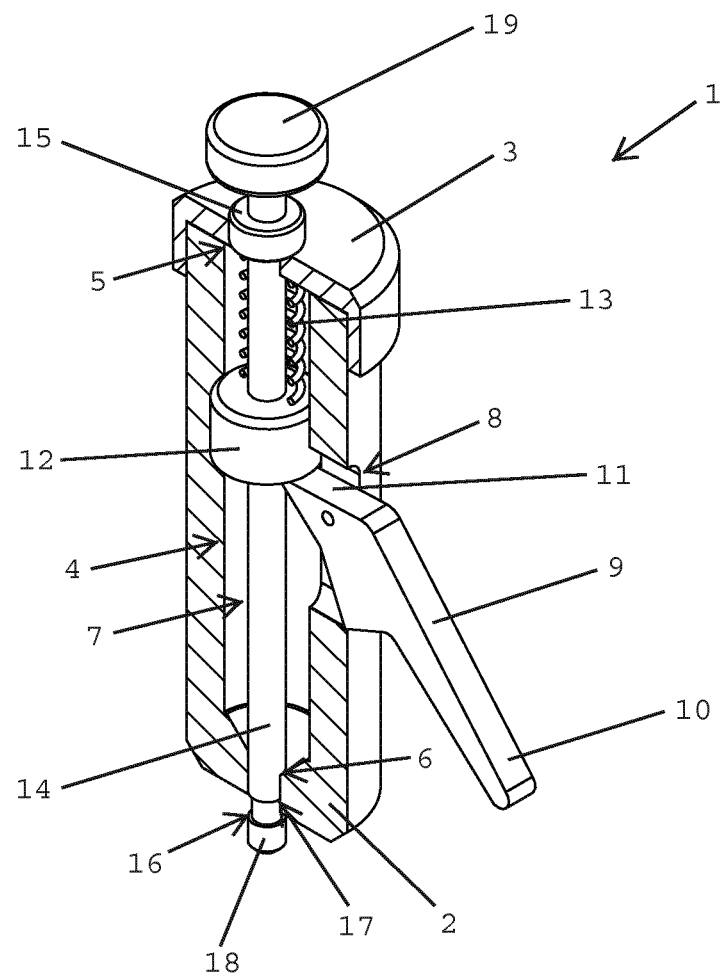
FIG. 1A a schematic sectional view and FIG. 1B a simplified partial sectional view of a dispenser with a substantially cylindrical container for spreadable material and with a metering plunger in a discharge position.

FIGS. 1A, 1B, 2A, 2B, 3A and 3B each show a dispenser 1 comprising a housing 2 which, together with a housing lid 3, forms a container 4. The housing lid 3 closes an access opening 5 of the housing 2. The housing 2, and thus the container 4, comprises a discharge opening 6 in a bottom positioned opposite the housing lid 3. The discharge opening 6 corresponds to an inside end of a cylindrical bore formed in the bottom of the housing 2. The volume 7 defined by the container 4 for receiving a substance to be discharged has an elongated, essentially cylindrical shape. In the area of the discharge opening 6 the volume 7 has a shape conically tapering toward the discharge opening 6. A gap 8 having a support of a pivotable actuating lever 9 is provided in a side wall of the housing 2.

The actuating lever 9 comprises a first lever arm 10 arranged essentially outside the housing 2, for operating the actuating lever 9, and a second lever arm 11 arranged essentially in the housing 2. The second lever arm 11 interacts with a tensioning piston 12 mounted displaceably in the housing 2, in order to displace the tensioning piston 12 against the restoring force of a spring element 13, which is the drive element of the dispenser 1. The spring element 13 is formed by a spiral spring accommodated in the housing 2. On one end, the spring element 13 is connected to the tensioning piston 12 and, on the other end, to the housing lid 3. When the spring element 13 is biased in operation under the effect of the actuating lever 9, the spring force thus acts between the housing lid 3 and the displaceably mounted tensioning piston 12. The housing lid 3 is connected to the housing 2 in such a way that it reliably closes housing 2 also under the effect of the spring force. Preferably, the housing lid 3 is screwed together with the housing 2, whereby it is possible to take off the housing lid 3 in a simple manner (together with the tensioning piston 12, the spring element 13 and the metering device 14) for refilling the container 4.

The tensioning piston 12 is secured to a metering device 14. The metering device 14 is formed by an elongated, cylindrical piston (also called "metering plunger") passing through the container 4, which, on the one hand, is mounted movably in the housing lid 3 and, on the other hand, in the discharge opening 6 of the housing 2. Outside the housing lid 3, the metering device 14 is secured to a plunger stop 15, which limits a displacement of the metering device 14 in the direction of ejection, i. e. toward the discharge opening 6 (in FIG. 1 downwards). A displacement of the metering device 14 in the opposite direction, i. e. in the direction toward the housing lid 3 (in FIG. 3 upwards) is limited by the tensioning piston 12, the spring element 13 and the housing lid 3.

On its end opposite the plunger stop 15, the metering device 14 comprises a recess 16 for conveying the substance stored in the container 4 and to be discharged through the discharge opening 6 and out of the container 4. The recess 16 is preferably formed as an annular cavity in the piston, so that in the discharge position shown in FIGS. 1A and 1B an amount of substance conveyed in the recess 16 is discharged from the recess 16 essentially annularly in all directions.

The bore in the bottom of the housing 2, whose inner end forms the discharge opening 6, forms a discharge channel 17 connecting to the discharge opening 6 along its extension in parallel to the movement axis of the metering device 14. The dimension or length of the recess 16 in parallel to the movement axis of the metering device 14, along which the metering device 14 is displaceably mounted, is preferably shorter than the length of the discharge channel 17. Thus, the recess 16 can be completely closed temporarily during conveyance through the discharge channel 17 through the wall of the discharge channel 17 and form a closed metering volume. Depending on the position of the metering device 14 the volume of the recess 16 communicates with either the volume of the container 4 or the surroundings of the dispenser 1 or with none of these two. Accordingly, the metering device 14 forms a sluice together with the discharge channel 17 between the container volume and the surroundings of the dispenser 1.

Figure 2A:
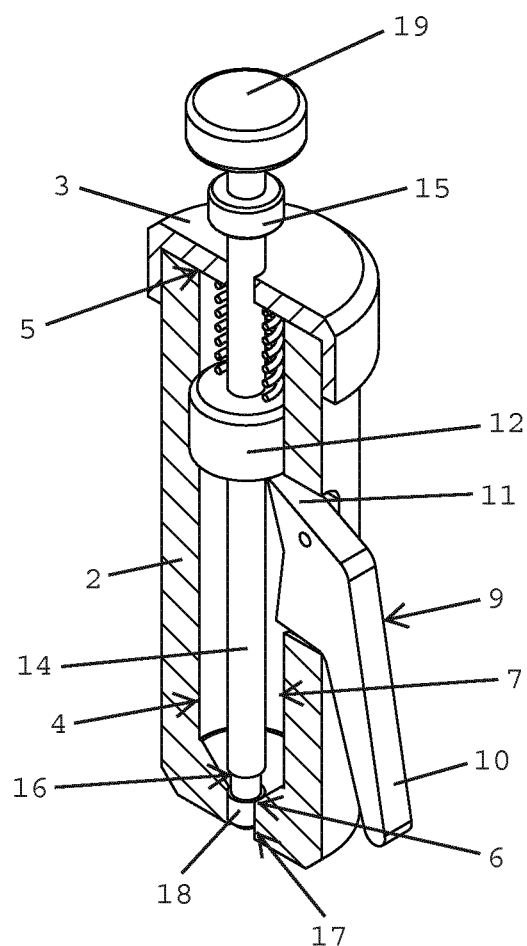
FIG. 2A a schematic sectional view and FIG. 2B a simplified partial sectional view of the dispenser according to FIGS. 1A and 1B in a receiving position.
Figure 2B:
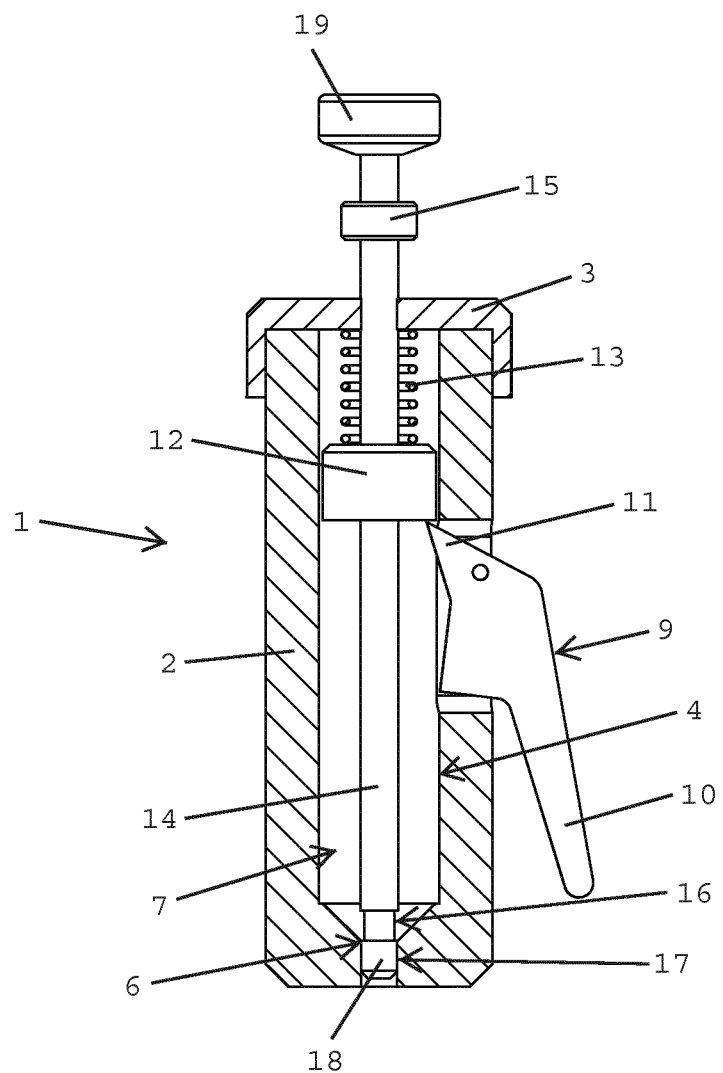
Figures 3A, 3B:
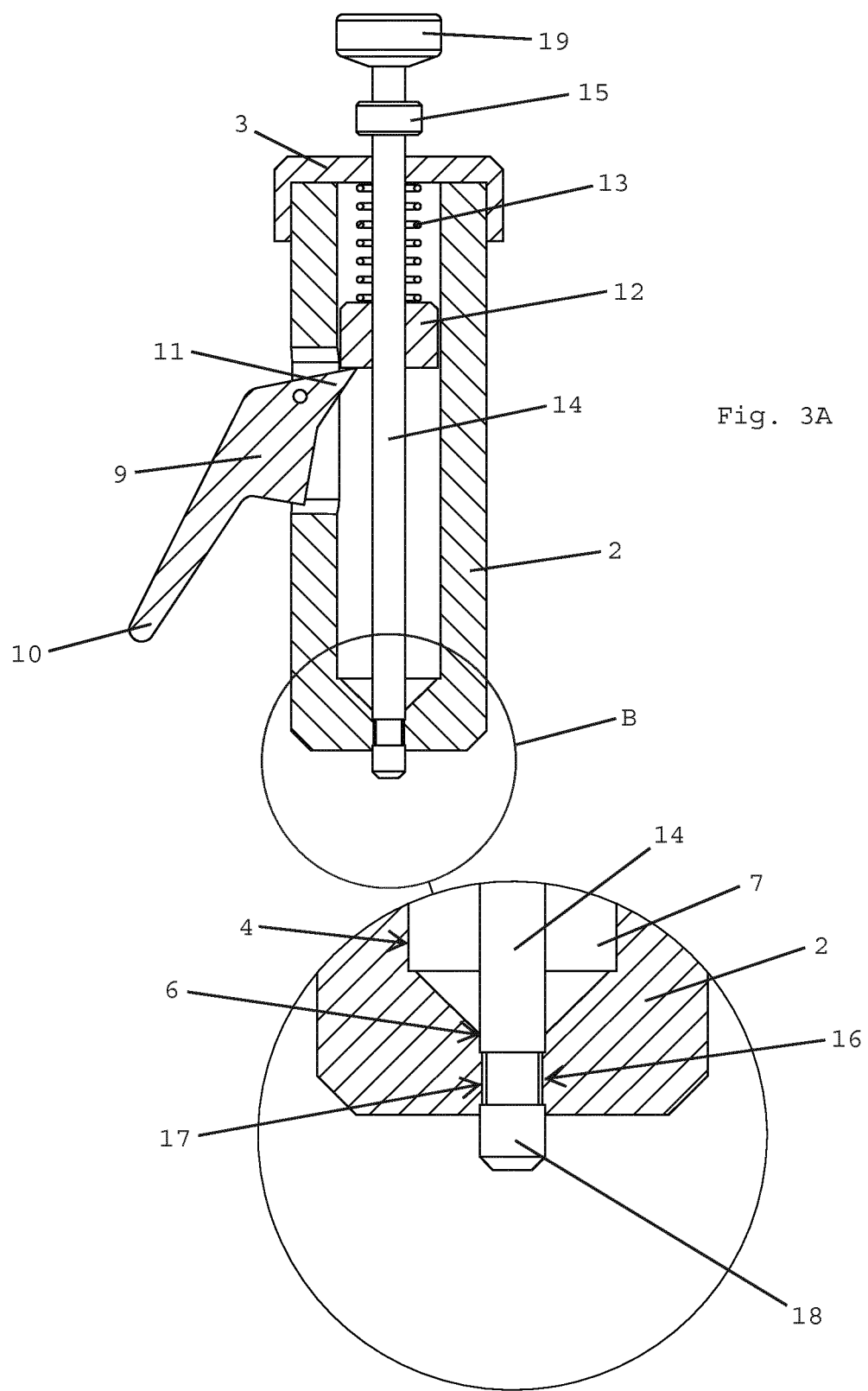
FIG. 3A a simplified sectional view of the dispenser according to FIGS. 1A and 1B in a conveying position, in which the recess is completely closed, and FIG. 3B the detail B of FIG. 3A.

In particular, due to the dimension of the recess 16 and the closure part 18 limiting the recess 16 to the end of the metering device 14, the discharge channel 17 is closed by the receiving part 18 in the receiving position of the metering device 14 shown in FIGS. 2A and 2B, in which a volume of the at least one recess communicates with a volume of the container. Accordingly, the container 4 as a whole is closed vis-à-vis its surroundings in this position.

Figure 1B:
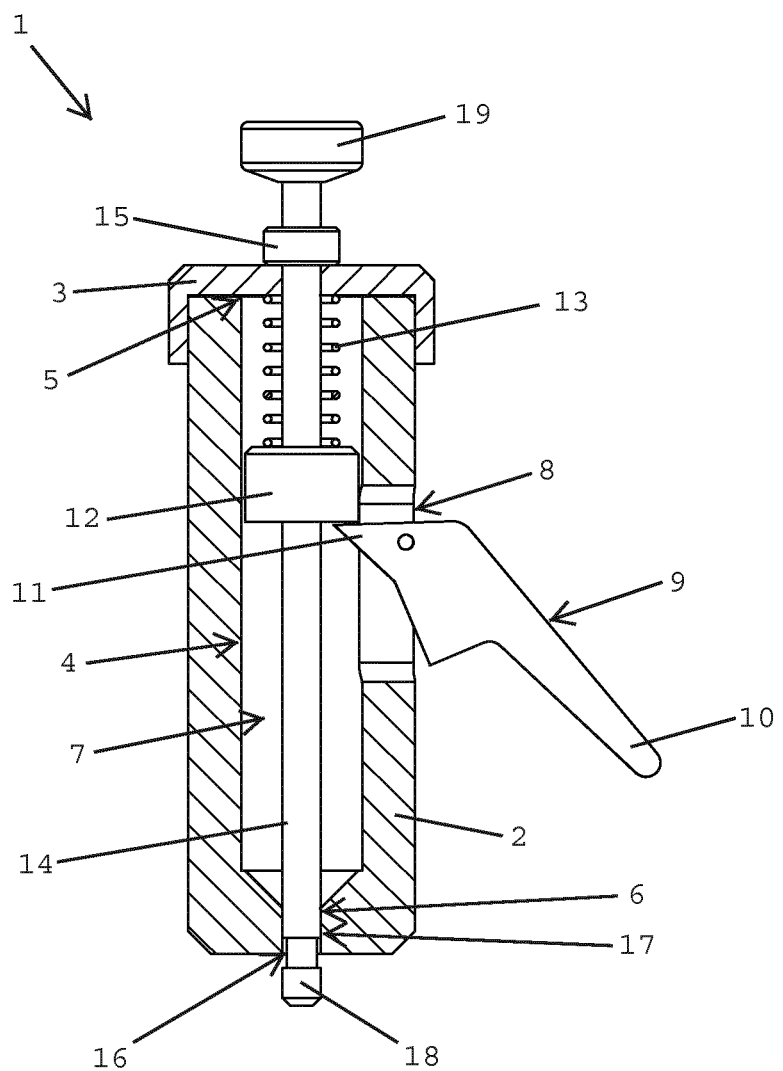

When the dispenser 1 is in operation, starting from the discharge position shown in FIGS. 1A and 1B for discharging an amount of substance of the substance to be discharged, which is kept in the container 4, the following steps are performed: The first lever arm 10 of the actuating lever 9 is pulled towards the housing 2 by the user. Thereby, the second lever arm 11 is pivoted toward the housing lid 3 and displaces the tensioning piston 12 against the restoring force of the spring element 13, so that the spring element 13 is biased. At the same time, the metering device 14 connected to the tensioning piston 12 is pulled through the discharge opening 6 and into the container 4, until the recess 16 is positioned at least partially inside the container 4. In this receiving position (cf. FIGS. 2A and 2B) the volume of the recess 16 communicates with the container volume 4. To effect that the substance to be discharged passes from the container 4 and into the recess 16, in operation, the dispenser 1 is held in such a manner that the substance to be discharged is collected in the area of the recess 16 by gravity. In particular, in the case of a container 4 being less than half full, the bottom of the housing 2 comprising the discharge opening 6 is to point downwards or at least transversely downwards. If now the actuating lever 9 is further pivoted, the spring element 13 reaches a reproducible maximum deflection at the point where the second lever arm 11 laterally slips off the tensioning piston 12, thus releasing the biased spring element 13. As a result of the spring force acting on the metering device 14 by means of the released tensioning piston 12, the metering device 14 is now accelerated in the direction of ejection, that is toward the discharge opening 6. This results in an acceleration of the amount of substance of the substance to be discharged and received in the recess 16 of the metering device 14 in the direction of ejection, as the amount leaves the dispenser 1. Thus, the metering device 14 passes through the conveyance position shown in FIGS. 3A and 3B, in which the recess 16 is closed by the wall of discharge channel 17. The volume enclosed by the recess 16 and the adjacent wall of the discharge channel 17 in this conveyance position defines the maximum volume of the substance to be discharged in a discharge cycle. The displacement of the metering device 14 again terminates in the discharge position (according to FIGS. 1A and 1B), as soon as the plunger stop 15 impinges on the housing lid 3 and thus abruptly stops the metering device 14. The amount of substance received in the recess 16 is not fixed to the metering device 14 and thus is laterally ejected from the recess 16 due to its pulse previously received, the end portion 18 of the metering device 14 or its shape, respectively determining the deflection and thus the direction and the spreading (distribution) of the ejection.

The end portion 18 can preferably be provided as an element screwed together with the remaining piston of the metering device 14, so that the volume of the recess 16 is adjustable by further or lesser screwing of the end portion 18.

The actuating lever 9 allows a one-hand operation of the dispenser 1, the housing 2 being held in the palm, for instance, and the first lever arm 10 being guided or pulled with the fingers—as is the case in closing one's fist—towards the housing.

Of course, an embodiment without an actuating lever is alternatively conceivable, in which e. g. the piston forming the metering device 14 is directly operated by means of a grip 19 on the metering device 14. Thus, the housing 2 can be held with one hand, while the grip 19 is grasped with the second hand and pulled away from the housing 2 up to the stop. When the metering device is pulled to a defined stop and released from there, the spring element causes—just like in the previously described variant—a reproducible movement (acceleration in the direction of ejection and abrupt stopping) of the metering device 14 and thus a reproducible spreading behaviour.

For the sake of simplicity, the other Figures show the embodiment without the actuating lever 9 and also without the optional grip 19, whereby the embodiments illustrated below, of course, can be provided with an actuating lever 9 or grip 19, analogously to FIGS. 1A and 1B. Otherwise, in order to avoid repetitions in the dispensers described below, only the differences to the dispenser 1 shown in FIG. 1 are dealt with; otherwise same elements are designated with same reference numbers.

Figure 4A:
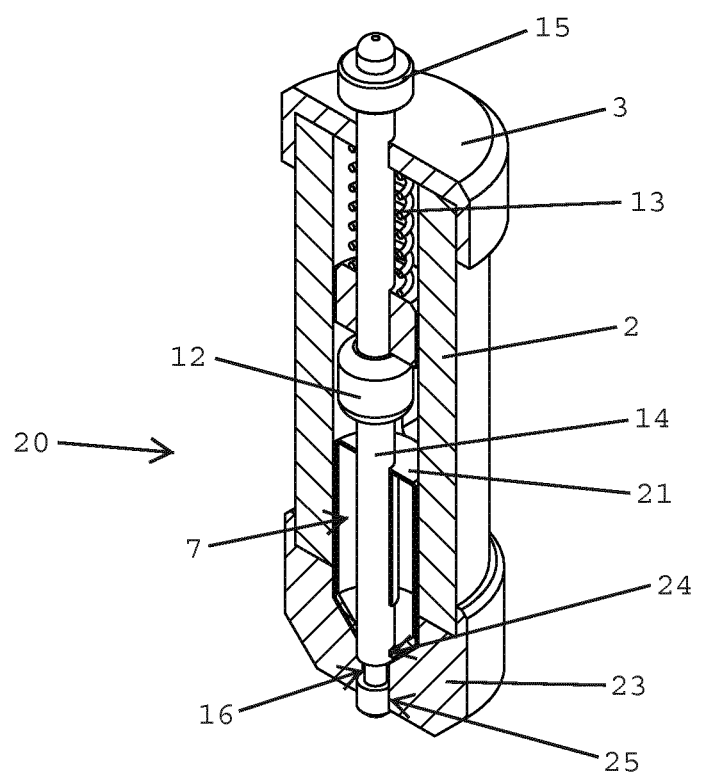
FIG. 4A a schematic sectional view and FIG. 4B a partial sectional view of a dispenser with a cartridge for spreadable material.
Figure 4B:
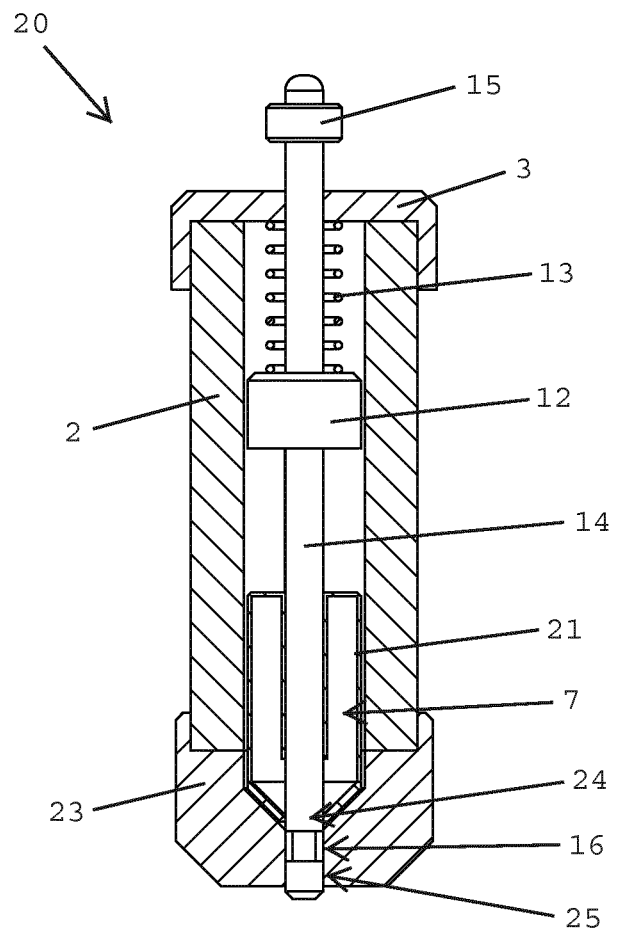

The dispenser 20 shown in FIGS. 4A and 4B differs from the dispenser 1 shown in FIGS. 1A and 2B by a cartridge 21 accommodated in the housing 2 (cf. FIGS. 5A-C), which forms the container 22 to store the substance to be discharged. To facilitate replacement of the cartridge 21, the housing 2 is made of an essentially cylindrical sheath, a closure cap 23 being mounted (e. g. screwed, pinned or held by means of a bayonet catch) at one end of the housing 2 opposite the known housing lid 3. The closure cap 23 holds the cartridge 21 in the housing 2. The metering device 14 is movable relative to the discharge opening 24 of the cartridge 21 and is mounted to be displaced in a discharge channel 25 formed in the closure cap 23 adjacent to the discharge opening 24. The metering device 14 is essentially the same as the metering device 14 according to FIGS. 1A and 1B.

The position of the metering device 14 shown in FIGS. 4A and 4B corresponds to a conveyance position (cf. FIGS. 3A and 3B) between the receiving position (cf. FIGS. 2A and 2B) and the discharge position (cf. FIGS. 1A and 1B), in which conveyance position the volume of the recess 16 in the discharge channel 25 is closed.

Figure 5A:
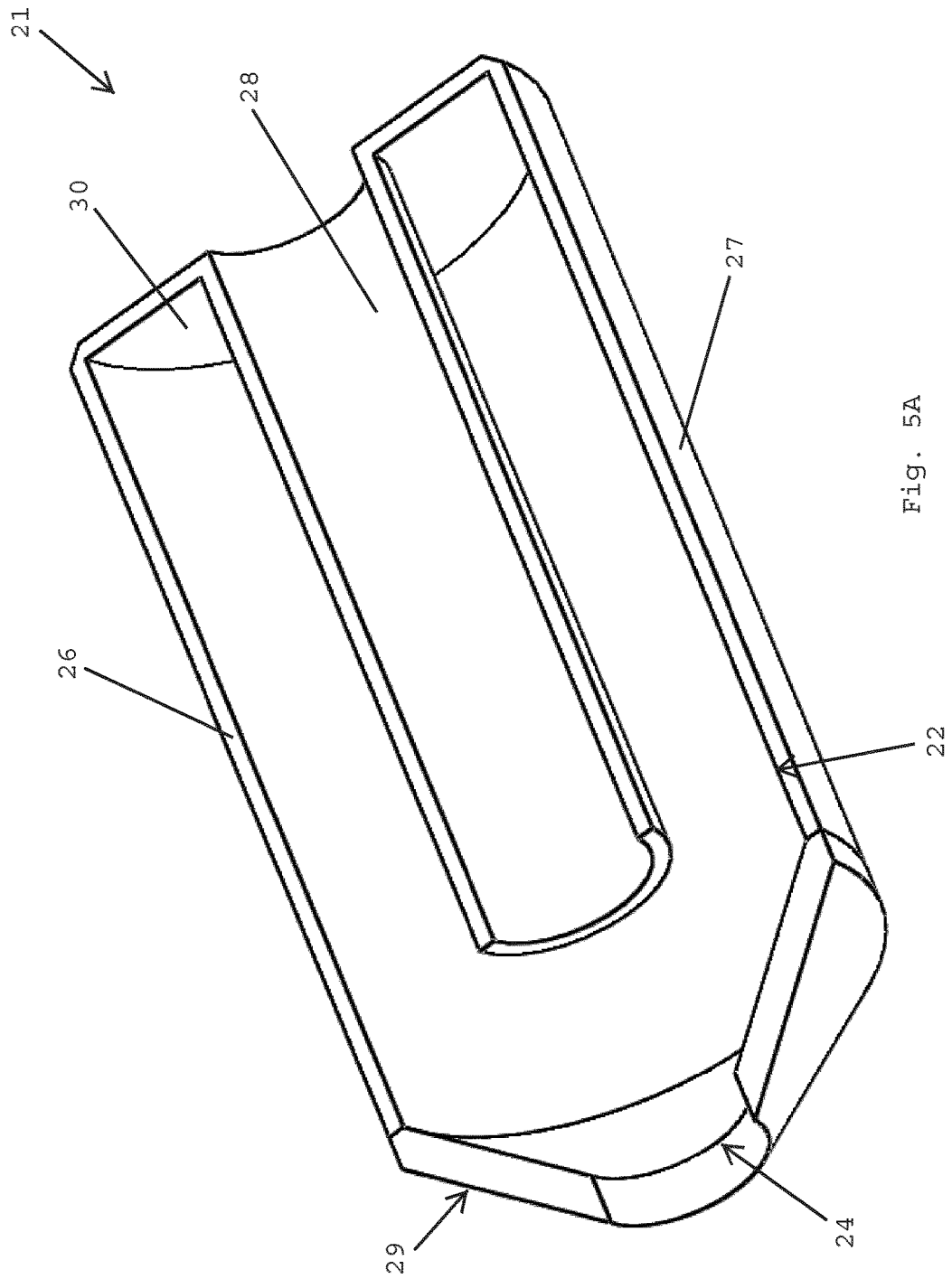
FIG. 5A a schematic sectional view, FIG. 5B a side view and FIG. 5C a sectional view of a cartridge for use in a dispenser according to FIGS. 4A and 4B.

The cartridge 21 for use in a dispenser according to FIGS. 4A and 4B is shown in FIGS. 5A-C in more detail. The cartridge 21 comprises a cartridge housing 26 which comprises an essentially cylindrical outer sheath 27 and a concentric, essentially cylindrical inner sheath 28. The outer sheath 27 comprises a section 29 conically tapering towards the discharge opening 24. The inner sheath 28 is connected via an annular cartridge bottom 32 to the end of the outer sheath 26 opposite the discharge opening 24. The inner cross-section of the cartridge bottom 30, that is the opening in the cartridge bottom 30, and of the inner sheath 28 essentially corresponds to the cross-section of the discharge opening 24, so that a metering device 14 passing through the cartridge 21 (cf. FIGS. 4A and 4B) closes the cartridge at least in one discharge position. The inner sheath 28 starts from the cartridge bottom 30 and terminates at a distance ahead of the discharge opening 24. This distance corresponds to the intended (in an adjustable recess: maximum) length of the recess 16 of the metering device 14. The container 22 is essentially limited by the inner side of the outer sheath 27, the inner side of the cartridge bottom 30 and the outer side of the inner sheath 28.

Figure 6A:
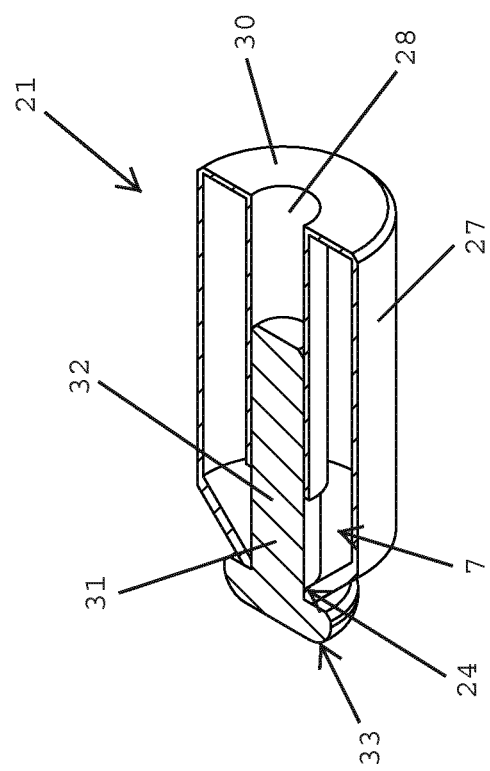
FIG. 6A a schematic sectional view, FIG. 6B a side view, and FIG. 6C a sectional view of a cartridge according to FIGS. 5A-C comprising a closure element.

For conveyance, the cartridge 21 is closed by a plug 31, as is shown in FIGS. 6A-C for the cartridge according to FIGS. 5A-C. The plug 31 comprises an elongated pin 32 passing from the discharge opening 24 and up to the inner sheath 28 in the shown closed position, and a plug cap 33 which closes and protects the conical section 29 and prevents it from slipping toward the cartridge bottom 30 as well as facilitates the removal of the plug 31. The cross-section of the pin 32 essentially corresponds to the cross-section of the metering device 14 of the dispenser 20 for the use of the cartridge 21.

For using the cartridge 21, first of all the closure cap 23 is removed from the housing 2 of the dispenser 20, a cartridge 21 previously present in the dispenser 20 is removed from and taken out of the metering device 14, the plug 31 of the new, filled cartridge 31 is removed, the cartridge 21 is pushed onto the metering device 14 and fixed in the housing 2 by means of applying the closure cap 23. During this refill process, that is when the plug 31 is pulled out manually, the dispenser and the cartridge are to be held perpendicularly with the tip upwards, whereby the cartridge may be filled only up to the end of the inner sheath 28. However, the plug 31 preferably may also be pushed through the metering device and out of the cartridge 21 upon being pushed onto the metering device 14, so that the substance stored in the cartridge 21 and to be discharged by the dispenser is separated from the surroundings during the entire replacement. In this manner, contamination of the cartridge contents, that is the substance received in the container 22 can be prevented not only during the use of the dispenser 20 but also already during insertion of the cartridge.

Figure 7A:
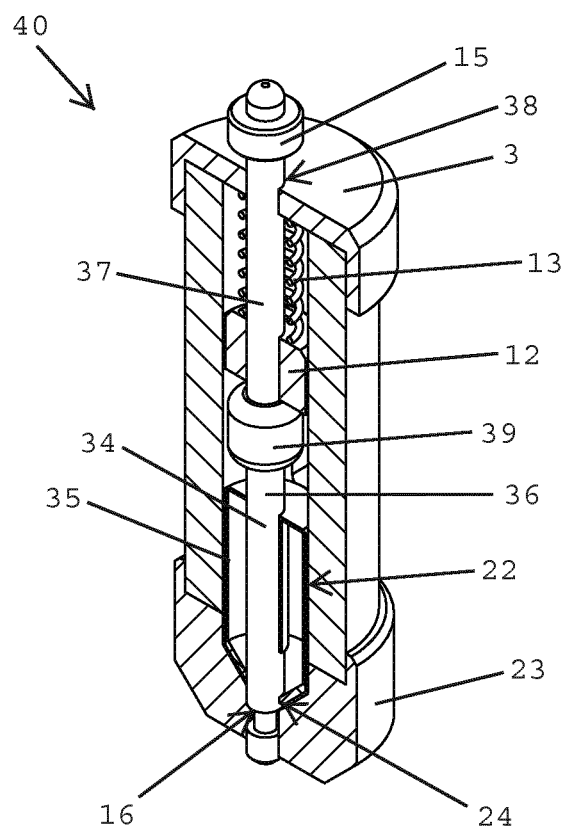
FIG. 7A a schematic sectional view, and FIG. 7B a schematic sectional view of a dispenser comprising a cartridge for spreadable material, comprising a drive unit and a coupling for connecting the drive unit to a metering device of the cartridge.
Figure 7B:
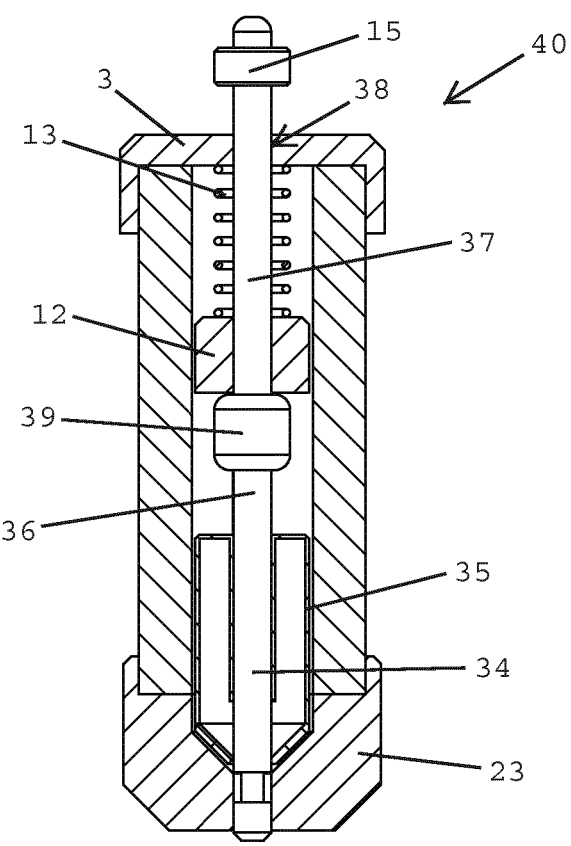

The integrity of the cartridge and the sound condition of the cartridge contents can be protected even better if the metering device closing the container in operation is part of the cartridge. A corresponding embodiment of the invention is shown in FIGS. 7A and 7B. The cartridge 35 comprises a metering device 34 having a recess 16 in the area of the discharge opening 24 of the cartridge 35; that is the metering device 34 is part of the cartridge 35. In operation, the metering device 34 is connected to the drive unit 37 of the dispenser 40 via a first coupling portion 36. The drive unit 37 is part of the dispenser 40 and is formed by a piston essentially continuing the metering device 34 of the cartridge 35 inserted in the dispenser 40. The cartridge 35 with the metering device 34 is held and immobilized in a cartridge support 2, 23 formed by the housing 2 and the closure 23. The drive unit 37 is part of the dispenser 40 and is connected to the tensioning piston 12 and the plunger stop 15 and is displaceably supported in a passage opening 38 in the housing lid.

The movement, in particular the acceleration of the drive unit 37 functions analogously to the movement of the metering device 14 in the dispensers according to FIGS. 1A and 1B or FIGS. 4A and 4B. The drive unit 37 comprises a second coupling portion 39, for example, in the form of a permanent magnet, so that the first coupling portion 36 of the metering device 34, which in this example comprises a ferromagnetic material, is held in connection with the second coupling portion 39. Thus, the metering device 34 is taken along upon retraction of the drive unit 37 due to the connection of the coupling portions 36, 39, for example due to the acting magnetic forces of the second coupling portion 39, and upon pushing forward the drive unit 37, the accelerating spring force of the spring element 13 is transferred directly onto the metering device 34 by means of the mechanical contact. On the whole, the metering device 34 of the cartridge 35 thus follows the movement of the drive unit 36 of the dispenser 40 and, in operation, consequently acts like a continuous metering device 14 according to FIGS. 1A and 1B or FIGS. 4A and 4B.

When replacing the cartridge 35, the metering device 34 is released from the second coupling portion 39, in that e. g. the connecting forces between the coupling portion 36, 39 are overcome by a manual tensile or tilting movement, and subsequently the cartridge 35 is removed and replaced together with the pertinent metering device 34. Thus, a new cartridge 35 is provided with a metering device 34 already upon production directly after filling and closed, which closes the container 22 formed by the cartridge 35 already during delivery and during the entire period of use of the cartridge 35.

Figure 8A:
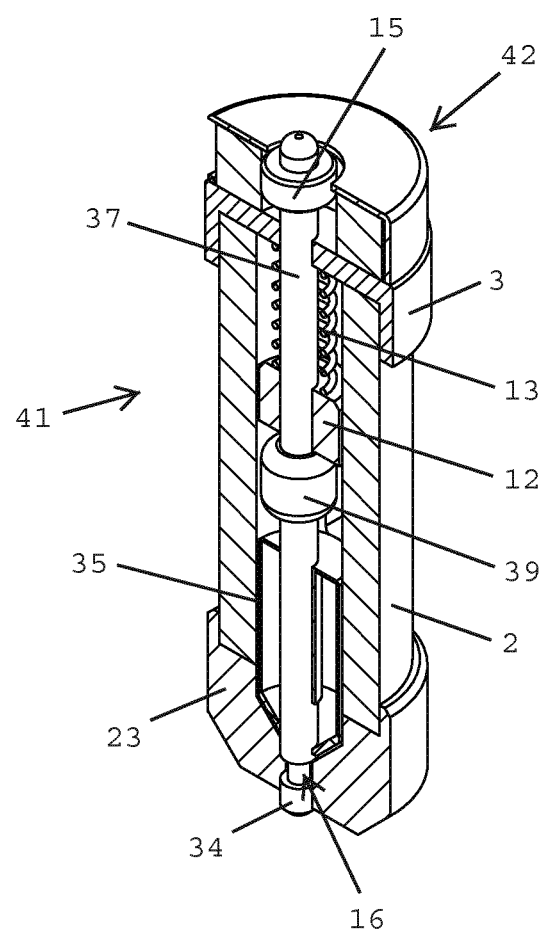
FIGS. 8A and 8B a plunger according to FIGS. 7A and 7B, comprising a counting device connected to the drive unit.
Figure 8B:
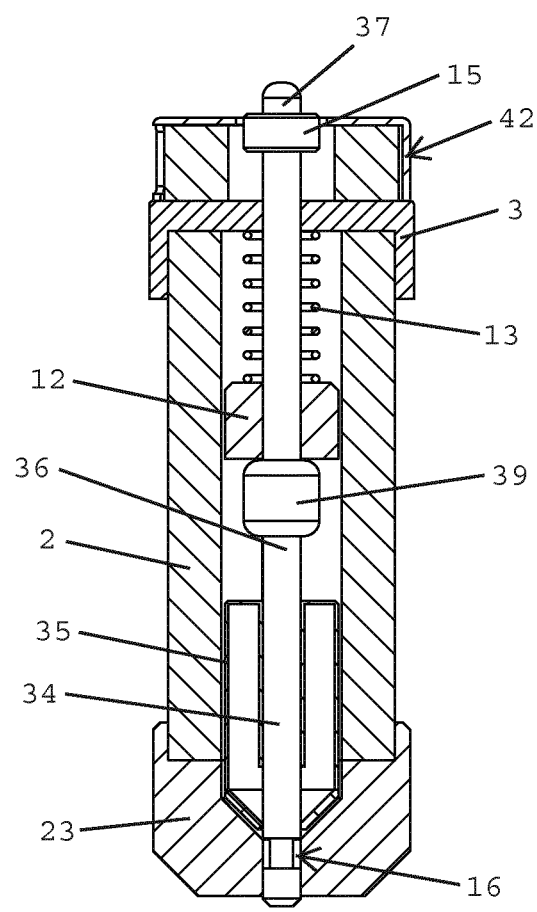

Another preferred embodiment of dispenser 41 is shown in FIGS. 8A and 8B. The dispenser 41 comprises all features of the dispenser 40 according to FIGS. 7A and 7B, so that with respect to the basic construction reference is made to the above description. In addition, a counting device 42 is provided on the housing lid 3 and connected to the housing lid 3. The counting device 42 records the movement of the drive unit 37 or—in the case of a use in a dispenser according to FIGS. 4A and 4B—the metering device 14 and the discharge cycles executed thereby. Since with each discharge cycle a fixed maximum amount of substance to be discharged can be discharged, which is defined by the volume of the recess 16, the counter reading provided by the counting device 42 allows simple and exact supervision of the entire (maximum) discharged amount of substance.

The invention claimed is:

1. A dispenser for discharging an amount of a substance to be discharged, the dispenser comprising:
    a container with a discharge opening;
    a metering device mounted movably relative to said discharge opening and having at least one recess for conveying the substance to be discharged through the discharge opening and out of the container; and
    a drive element;
    wherein said metering device is connected to the drive element, the drive element comprising a spring element;
    wherein the drive element is a spring element configured to accelerate, by a force of the spring element, an amount of the substance, which is received in the recess of the metering device in a direction of ejection, as said amount leaves the dispenser.

2. The dispenser according to claim 1, wherein the container is formed by a replaceable cartridge.

3. The dispenser according to claim 1, wherein the metering device is formed by a piston mounted displaceably relative to the container.

4. The dispenser according to claim 1, wherein the container is closed by the metering device relative to surroundings of the container, at least in a receiving position of the metering device, in which a volume of the at least one recess communicates with a volume of the container.

5. The dispenser according to claim 4, wherein the spring element is biased in the receiving position.

6. The dispenser according to claim 1, wherein a volume of the at least one recess of the metering device is adjustable.

7. The dispenser according to claim 1, comprising a discharge channel adjoining the discharge opening of the container, whereby the metering device forms a sluice together with the discharge channel.

8. The dispenser according to claim 1, wherein the metering device of the dispenser or the drive unit is connected to a counting device, whereby the counting device is configured to count the discharge cycles when using the dispenser.

9. A dispenser for discharging an amount of a substance to be discharged, the dispenser comprising:
    a cartridge holder for holding a cartridge with a metering device, wherein the metering device comprises a first coupling portion and a recess;
    a drive unit that is mounted movably relative to the cartridge holder; and
    a drive element;
    wherein the drive unit comprises a second coupling portion for connection to the first coupling portion of the cartridge when the cartridge is held by the cartridge holder; and
    wherein the drive unit is connected to the drive element;
    wherein the drive element comprises a spring element, which in operation is configured with the cartridge and held in the cartridge holder to accelerate, by a force of the spring element, an amount of substance, which is received in the recess of the metering device of the cartridge in a direction of ejection, upon leaving the dispenser.

10. A cartridge for use in a dispenser with a drive unit, wherein the drive unit comprises a first coupling portion and is connected to a drive element, the drive element comprising a spring element, the cartridge comprising:
    a container with a discharge opening; and
    a metering device that is mounted movably relative to said discharge opening and that has at least one recess for conveying a defined maximum volume of the substance to be discharged through the discharge opening and out of the container,
    wherein the metering device comprises a second coupling portion for connection to said first coupling portion of the dispenser, wherein in a connected state, a force exerted by the drive element of the dispenser is transmitted by the first coupling portion and the second coupling portion to the metering device.

11. The cartridge according to claim 10, wherein the metering device is formed by a piston mounted displaceably relative to the container.

12. The cartridge according to claim 10, wherein the container is closed by the metering device relative to surroundings of the container, at least in a receiving position of the metering device, in which a volume of the at least one recess communicates with a volume of the container.

13. The cartridge according to one of claim 10, wherein the volume of the at least one recess of the metering device is adjustable.

14. A method for using a dispenser, for discharging an amount of a substance to be discharged, the dispenser comprising: a container with a discharge opening;

a metering device mounted movably relative to said discharge opening and having at least one recess for conveying the substance to be discharged through the discharge opening and out of the container;

wherein said metering device is connected to a drive element, the drive element comprising a spring element;

wherein the drive element is configured to accelerate an amount of the substance, which is received in the recess of the metering device in a direction of ejection, as said amount leaves the dispenser;

the method comprising operating the dispenser for at least one discharge cycle, wherein a discharge cycle comprises a movement of the recess of the metering device from a receiving position, in which a volume of the at least one recess communicates with a volume of the container, through the discharge opening into a discharge position, in which a volume of the at least one recess communicates with the surroundings of the dispenser, accelerating an amount of substance conveyed in the recess in a direction of ejection by the spring element, prior to reaching the discharge position.

15. A method for using a dispenser according to claim 14, wherein an amount of substance conveyed in the recess is abruptly stopped by the drive element upon reaching the discharge position.

16. The method for using a dispenser according to claim 15, wherein an amount of substance conveyed in the recess is abruptly stopped by a plunger stop connected to the drive element upon reaching the discharge position.

* * * * *